(12) United States Patent
Kandapallil et al.

(10) Patent No.: US 11,479,655 B2
(45) Date of Patent: Oct. 25, 2022

(54) COMPOSITIONS FOR USE WITH POLYSULFIDE SEALANTS AND RELATED METHODS

(71) Applicant: The Boeing Company, Chicago, IL (US)

(72) Inventors: Binil Itty Ipe Kandapallil, Summerville, SC (US); Siji Thomas, Summerville, SC (US)

(73) Assignee: The Boeing Company, Chicago, IL (US)

( * ) Notice: Subject to any disclaimer, the term of this patent is extended or adjusted under 35 U.S.C. 154(b) by 178 days.

(21) Appl. No.: 16/743,375

(22) Filed: Jan. 15, 2020

(65) Prior Publication Data
US 2021/0214526 A1 Jul. 15, 2021

(51) Int. Cl.
*C08K 5/37* (2006.01)
*C09J 181/04* (2006.01)

(52) U.S. Cl.
CPC ............... *C08K 5/37* (2013.01); *C09J 181/04* (2013.01)

(58) Field of Classification Search
CPC . C08K 5/37; C09J 181/04; C08L 81/02; C08J 11/28; C08J 11/10; C08J 11/14; C08J 11/24; C08J 2381/04
See application file for complete search history.

(56) References Cited

U.S. PATENT DOCUMENTS

| 1,184,164 | A | | 5/1916 | Blackmore | |
|---|---|---|---|---|---|
| 4,020,218 | A | * | 4/1977 | Ranney | C08K 5/54 427/407.1 |
| 4,756,783 | A | * | 7/1988 | McShane | C08G 75/14 156/104 |
| 8,957,007 | B2 | | 2/2015 | Moorre | |
| 2012/0138206 | A1 | * | 6/2012 | Wagner | C08K 5/12 156/60 |
| 2014/0023555 | A1 | * | 1/2014 | Monzyk | A62D 3/37 422/28 |
| 2015/0158969 | A1 | * | 6/2015 | Nowak | C08G 18/758 528/70 |

FOREIGN PATENT DOCUMENTS

| CN | 107815056 A | 3/2018 |
|---|---|---|
| CN | 108341958 A | 7/2018 |
| WO | WO 2006/065266 | 6/2006 |
| WO | WO2012/021754 | 2/2012 |
| WO | WO 2012/135594 | 10/2012 |

OTHER PUBLICATIONS

Extended Search Report issued on European Application EP 21150039, dated May 26, 2021.
Tsarevsky et al., "Reversible Redox Cleavage/Coupling of Polystyrene with Disulfide or Thiol Groups Prepared by Atom Transfer Radical Polymerization," *Macromolecules*, vol. 35, No. 24, Nov. 19, 2002, pp. 9009-9014.

* cited by examiner

*Primary Examiner* — Dah-Wei D. Yuan
*Assistant Examiner* — Nga Leung V Law
(74) *Attorney, Agent, or Firm* — Bell & Manning, LLC

(57) ABSTRACT

Compositions for modifying a degree of cure in a polysulfide sealant are provided. In embodiments, the composition comprises a water-miscible organic solvent; water; and a dithiol. Polysulfide sealant systems comprising the compositions are also provided. Methods for modifying a degree of cure in a polysulfide sealant using the compositions are also provided.

26 Claims, No Drawings

COMPOSITIONS FOR USE WITH POLYSULFIDE SEALANTS AND RELATED METHODS

BACKGROUND

Polysulfide sealants are used throughout the aerospace industry, e.g., to protect and seal components of fuel tanks. Periodically, these sealants need to be removed. However, because polysulfide sealants are designed to be extremely durable and adhere strongly to the substrates with which they are in contact, removing them is difficult. Existing polysulfide sealant removal techniques have involved scraping or abrading the sealants, which is time consuming and can damage surrounding substrates. Compositions for removing polysulfide sealants are available, but include harsh chemicals. Although these harsh chemicals can be effective, they can be malodorous, pose environmental and health hazards, and can also damage surrounding substrates.

SUMMARY

Provided are compositions for use with polysulfide sealants. Methods of using the compositions are also provided.

In one aspect, compositions for modifying a degree of cure in a polysulfide sealant are provided. In a first embodiment, the composition comprises a water-miscible organic solvent; water; and a dithiol. In the first embodiment, the dithiol may be a 1,4 dithiol. In any of the preceding embodiments, the dithiol may be dithiothreitol (DTT), dithioerythritol (DTE), or both DTT and DTE. In any of the preceding embodiments, the water-miscible organic solvent may be a ketone, an aldehyde, an alcohol, or a combination thereof. In any of the preceding embodiments, the composition may comprise a greater amount of the organic solvent than the water. In any of the preceding embodiments, the dithiol may be present at an amount in a range of from 0.1 weight % to 10 weight %. In any of the preceding embodiments, the composition may have a pH in a range of from 7 to 10, or a pH in a range of from 8 to 9. In any of the preceding embodiments, the composition may further comprise a gelling agent, a basic pH agent, or both. In any of the preceding embodiments, the composition may consist essentially of the water-miscible organic solvent; the water; the dithiol; and optionally, a gelling agent, a basic pH agent, or both.

In another aspect, polysulfide sealant systems are provided. In a first embodiment, the system comprises a composition for modifying a degree of cure in a polysulfide sealant, the composition comprising a water-miscible organic solvent; water; and a dithiol; and a curable polysulfide composition for forming the polysulfide sealant. In the first embodiment, the polysulfide sealant may have a $T_g$ in a range of from $-70°$ C. to $-40°$ C.

In another aspect, methods of using any of the embodiments of the polysulfide sealant systems are provided. In a first embodiment, the method comprises forming the polysulfide sealant from the curable polysulfide composition; and applying the composition for modifying the degree of cure in the polysulfide sealant to a surface of the polysulfide sealant for a period of time. In the first embodiment, the polysulfide sealant may have a $T_g$ in a range of from $-70°$ C. to $-40°$ C.

In another aspect, methods for modifying a degree of cure in a polysulfide sealant are provided. In a first embodiment, the method comprises applying a composition comprising a water-miscible organic solvent; water; and a dithiol to a surface of a polysulfide sealant for a period of time, thereby forming a treated polysulfide sealant. In any of the preceding embodiments, the treated polysulfide sealant may comprise at least partially uncured polysulfide sealant and the method may further comprise applying a force sufficient to remove at least a portion of the at least partially uncured polysulfide sealant. In any of the preceding embodiments, the polysulfide sealant may be in contact with an aerospace structure. In any of the preceding embodiments, the applying of the composition may reduce a $T_g$ of the treated polysulfide sealant by at least $5°$ C. as compared to the polysulfide sealant, reduces a Shore A hardness of the treated polysulfide sealant by at least 5 units as compared to the polysulfide sealant, or both. In any of the preceding embodiments, the method may further comprise exposing the treated polysulfide sealant to an oxidizing atmosphere for an additional period of time. In any of the preceding embodiments comprising such exposure, the exposure may increase the treated polysulfide sealant's $T_g$ as compared to that of the polysulfide sealant, increase the treated polysulfide's Shore A hardness as compared to that of the polysulfide sealant, or both. In any of the preceding embodiments comprising such exposure, the exposure may increase the treated polysulfide sealant's $T_g$ to within $\pm 2°$ C. of that of the polysulfide sealant, the treated polysulfide sealant's Shore A hardness to within $\pm 2$ units of that of the polysulfide sealant, or both. In any of the preceding embodiments comprising such exposure, the polysulfide sealant may comprise a defect and the method further comprises repairing the defect prior to exposing the treated polysulfide sealant to the oxidizing atmosphere for the additional period of time. In any of the preceding embodiments, the polysulfide sealant may have a $T_g$ in a range of from $-70°$ C. to $-40°$ C.

Other principal features and advantages of the disclosure will become apparent to those skilled in the art upon review of the detailed description and the appended claims.

DETAILED DESCRIPTION

Provided are compositions for use with polysulfide sealants. Methods of using the compositions are also provided.

Definitions

The terms "cure/crosslink" may be used interchangeably, depending upon context. Terms like "uncure/uncrosslink" and "re-cure/re-crosslink" may be similarly interchanged. Phrases like "cleaving crosslinks" refers to breaking the covalent bond(s) associated with the crosslinks and thus, to uncrosslinking/uncuring.

The phrases "degree of cure" and "degree of crosslinking" and the like refer to the amount of crosslinks in the relevant material as determined via $T_g$ or Shore A hardness or both, as described below.

The phrase "water soluble" refers to herein as having a solubility in water at room temperature (20 to 25° C.) of at least 1 mg/mL.

The phrase "water miscible" refers to herein as the capability of two substances to mix in all proportions.

The phrase "polysulfide sealant" refer to materials comprising organic polysulfide polymer chains crosslinked via disulfide bonds. The phrase does not encompass biological materials, e.g., DNA, RNA, proteins, enzymes, and the like which may comprise disulfide crosslinks. The phrase "polysulfide sealant" is intended to refer to the polysulfide sealant in its cured/crosslinked state. However, the phrase is not intended to necessarily mean 100% cured or to limit the polysulfide sealant to a specific degree of cure.

The phrase "aerospace structure" may refer to any device, craft, machine, part or element used in the aerospace industry such as an aircraft such as an airplane; a rotocraft; a space vehicle such as a space ship; drone; satellite; fuselage; wing; composite; and the like.

The compositions comprise an aqueous solvent system and an active ingredient which are more environmentally friendly, safer, and less harsh than those in existing polysulfide sealant removal compositions. The compositions are capable of modifying a degree of cure, i.e., the degree of crosslinking, in a variety of polysulfide sealants. Modifying the degree of cure includes cleaving crosslinks in polysulfide sealants, a feature which renders them easier to remove. However, under certain conditions, polysulfide sealants which have been treated with the compositions are also able to re-cure, i.e., the cleaved crosslinks are able to reform, a feature which allows the polysulfide sealants to be repaired. Such reversibility is believed to be unique to the present compositions as compared to existing polysulfide sealant removal compositions.

In one aspect, compositions for use with polysulfide sealants are provided, including for modifying a degree of cure in the polysulfide sealants. The compositions comprise a water-miscible organic solvent, water, and a dithiol. In embodiments, the dithiol is water soluble and has a solubility in water at room temperature (20 to 25° C.) of at least 1 mg/mL. In its unoxidized state, each thiol group of the dithiol exists as —HS. In its oxidized state, the dithiol forms a disulfide bond(s). One disulfide bond may be formed, an internal disulfide bond, such that the dithiol is in the form of a ring structure in its oxidized state. In embodiments, the dithiol is a 1,4-dithiol. In embodiments, the dithiol is dithiothreitol (DTT), dithioerythritol (DTE), like materials, or mixtures thereof. Combinations of different types of dithiols may be used, e.g., a combination of both DTT and DTE.

As further described below, the polysulfide sealant comprises a pair of polysulfide polymer chains crosslinked via disulfide bonds (i.e., S—S). The dithiol is capable of cleaving the disulfide crosslinks in the polysulfide sealant via a thiol-disulfide exchange reaction as shown in Scheme 1:

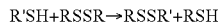
(Scheme 1)

In Scheme 1, R'SH represents the dithiol and RSSR represents crosslinked polysulfide polymer chains. Another thiol-disulfide exchange reaction may occur to provide 2RSH (the individual, now uncrosslinked, polysulfide polymer chains) and the oxidized form of the dithiol.

A variety of water-miscible organic solvents may be used, provided the organic solvent is able to mix in all proportions with water. However, the water-miscible organic solvent may be selected on the basis of its ability to solubilize the polysulfide polymer chains of the polysulfide sealant. Thus, the particular choice of organic solvent may depend upon the polysulfide sealant. Water-miscible alcohols, water-miscible aldehydes, and water-miscible ketones may be used. Illustrative water-miscible alcohols include methanol, ethanol, and isopropanol. Illustrative water-miscible aldehydes include methanal/formaldehyde, ethanal, and propanal. Water-miscible ketones include acetone, methyl ethyl ketone, and methyl propyl ketone. Combinations of different types of water-miscible organic solvents may be used.

Various relative amounts of the water-miscible organic solvent and water may be used. The relative amounts may be selected based upon considerations such as solubilizing the dithiol and solubilizing the polysulfide polymer chains of the polysulfide sealant. The ratio of the water-miscible organic solvent to water may be in a range of from 99:1 to 1:99. This includes from 50:1 to 1:50, from 25:1 to 1:25, from 10:1 to 1:10, and from 5:1 to 1:5. In embodiments, the composition may comprise a greater amount of water-miscible organic solvent than water. If more than one type of water-miscible organic solvent is used, the amounts and ratios refer to the total amount of water-miscible organic solvent in the composition.

Various amounts of the dithiol may be used. The amount may be selected to achieve a desired degree of uncrosslinking, e.g., greater amounts may be used to increase the rate of the thiol-disulfide exchange reactions described above to cleave more crosslinks in a given period of time. However, the amount of the dithiol is generally not so large to prevent dissolution in the selected aqueous solvent system. In embodiments, the dithiol is present in an amount of at least 0.1 weight % (as compared to the total weight of the composition). This includes an amount of at least 0.5 weight %, at least 1 weight %, at least 3 weight %, at least 5 weight %, or in a range of from 0.1 weight % to 10 weight %.

The present compositions may be characterized by their pH. Unlike existing polysulfide sealant removal compositions, the present compositions are able to function (cleaving crosslinks) at neutral and mildly alkaline conditions. In embodiments, the composition has a pH in a range of from 7 to 10. This includes a range of from 7 to 10, 8 to 9, and about 7. The pH may be adjusted by including a basic pH agent in the composition, e.g., a basic amine. Monoamines such as methyl amine, dimethyl amine, trimethylamine, allyl amine, butyl amine, and cyclohexylamine may be used. Diamines such as hexamethylenediamine, hexane diamines (e.g., 2,2,4(2,4,4)Trimethyl1,6-hexanediamine), propane diamine, piperidine, and pyrrolidine may be used. In embodiments, the basic pH agent does not comprise hydroxide (OH).

The present compositions may include other additives, depending upon the desired application. By way of illustration, viscosity modifiers may be used, including gelling agents, e.g., cellulose derivatives. Illustrative cellulose derivatives include methylcellulose, hydroxyethylcellulose, hydroxypropylcellulose, hydroxypropylmethylcellulose, carboxymethylcellulose, and the like, and combinations thereof. When present, the viscosity modifier may be present in a range of from 0.5 weight % to 10 weight %, from 1 weight % to 6 weight %, or from 1 weight % to 4 weight % (as compared to the total weight of the composition).

In embodiments, the composition comprises a gelling agent, a basic pH agent, or both.

The present compositions may be made by combining and mixing the various components under ambient conditions. The water-miscible organic solvent and water may be combined first and the dithiol and any additives subsequently added.

In embodiments, the present composition consists essentially of, or consists of, the water-miscible organic solvent, the water, the dithiol; and optionally, one or more additives. In embodiments, the composition consists essentially of, or consists of, the water-miscible organic solvent; the water; the dithiol; and optionally, a gelling agent, a basic pH agent, or both.

It is to be understood that the present disclosure extends to various combinations of the individual features described above. By way of example, the present disclosure encompasses compositions having any combination of the disclosed water-miscible organic solvents, water, and dithiol, wherein the ratio of water-miscible organic solvent to water is any of the disclosed ratios; the dithiol is present at any of the disclosed amounts; the pH is any of the disclosed pH values; and the composition is free of, or includes, any combination of the disclosed additives. As noted above, in embodiments the additives include one or more gelling agents such as methylcellulose, hydroxyethylcellulose, hydroxypropylmethylcellulose, and carboxymethylcellulose.

The polysulfide sealants to be used with the present compositions comprise organic polysulfide polymer chains crosslinked via disulfide bonds. Throughout the present disclosure, when the phrase "polysulfide sealant" is used alone (e.g., without a modifying adjective), the phrase is intended to refer to the polysulfide sealant in its cured/crosslinked state. However, the phrase is not intended to necessarily mean 100% cured or to limit the polysulfide sealant to a specific degree of cure. The degree of cure may be determined by (and thus, the polysulfide sealant characterized by) a glass transition temperature ($T_g$) value. Shore A hardness may also be used to determine the degree of cure as further described above. Again, although the unmodified phrase "polysulfide sealant" is not intended to limit the polysulfide sealant to a specific $T_g$, at least in embodiments, the polysulfide sealant will be characterized by a $T_g$ corresponding to a relatively high degree of cure, including a maximum degree of cure. The polysulfide sealants may be formed from curable polysulfide sealant compositions comprising reactive components that, upon mixing under appropriate conditions, induce curing/crosslinking to provide the polysulfide sealant. The present disclosure is not particularly limited to the type of polysulfide sealant. Indeed, a variety of polysulfide sealants formed from commercially available curable polysulfide sealant compositions according to manufacturer's instructions. When formed according to such instructions, the resulting polysulfide sealants may be characterized as being in their cured states, including having a relatively high degree of cure or a maximum degree of cure, and having a $T_g$ as specified by the manufacturer. In embodiments, the polysulfide sealant has a $T_g$ in a range of from −70° C. to −40° C., from −65° C. to −45, or from −60° C. to −50° C.

The unmodified phrase "polysulfide sealant" is also not intended to limit the polysulfide sealant to a particular form/morphology. By way of illustration, the polysulfide sealant may be in the form of a strip, layer, film, or coating. The polysulfide sealant may be in contact with (e.g., in direct contact with) an underlying substrate or an adjacent substrate. However, the polysulfide sealant may also be a distinct physical structure that is integrated within some other structure, e.g., an aerospace structure.

In another aspect, the present disclosure provides methods for modifying a degree of cure in a polysulfide sealant. The methods comprise applying any of the compositions described herein to a surface of any of the polysulfide sealants described herein. The technique for applying the compositions is not particularly limited. Illustrative application techniques include dipping or immersing the polysulfide sealant into the composition or spraying, painting, brushing, rolling, squirting, or pouring the composition onto the surface of the polysulfide sealant. The application technique may be carried out under ambient conditions, i.e., in air and at room temperature. However, other conditions may be used, depending upon the environment of the application. During contact of the present compositions with the polysulfide sealant, the dithiol cleaves disulfide crosslinks in the polysulfide sealant via the thiol-disulfide exchange reactions described above to form a treated polysulfide sealant comprising at least partially uncured polysulfide sealant.

The application is carried out so that the present composition and the polysulfide sealant remain in contact for a period of time. The period of time may depend upon the desired amount of disulfide crosslink cleavage, i.e., degree of uncuring, to be achieved. As demonstrated in the Examples, below, the degree of uncuring after a particular period of time may be determined by measuring the Shore A hardness and/or the $T_g$ of the treated polysulfide sealant. Durometers of Type A, operated in accordance with the manufacturer's instructions, may be used to measure Shore A hardness. The $T_g$ of the treated polysulfide sealant may be measured using standard differential scanning calorimetry (DSC) instruments operated in accordance with the manufacturer's instructions. The period of time may be selected to achieve a desired degree, e.g., maximum, of uncuring. The period of time may be selected to achieve a reduction of $T_g$ of at least 5° C. for the treated polysulfide sealant, or a reduction in Shore A hardness of at least 5 units for the treated polysulfide sealant, or both. This includes a reduction of $T_g$ of at least 6° C., at least 8° C., at least 10° C., at least 12° C., or in a range of from 5° C. to 12° C. This includes a reduction in Shore A hardness of at least 6 unites, at least 8 units, at least 10 units, at least 12 units, or in a range of from 5 units to 12 units. These reductions are as compared to the polysulfide sealant prior to treatment with the composition (which may be referred to as the polysulfide sealant or the pre-treated polysulfide sealant). Although the period of time that achieves these results may depend upon the selected composition, the selected polysulfide sealant, and the degree of cure in the polysulfide sealant prior to treatment, in embodiments, the period of time is at least 1 hour, at least 2 hours, at least 4 hours, at least 6 hours, no more than 8 hours, or in a range of from 1 hours to 8 hours.

After the selected period of time, the method may further comprise removing at least a portion of the at least partially uncured polysulfide sealant. As much as possible, or all, of the at least partially uncured polysulfide sealant may be removed. The technique for removing the at least partially uncured polysulfide sealant is not particularly limited. The technique may involve applying a force to the treated polysulfide sealant such as by wiping, abrading, blowing, brushing, or scraping, any of which may be carried out manually or mechanically. The method may further comprise repeating the application and removal steps multiple times to form and remove an additional amount of at least partially uncured polysulfide sealant, e.g., until most or all of the polysulfide sealant has been uncured and removed. This incremental process is particularly beneficial to prevent damage to a substrate with which the polysulfide sealant was in contact.

The Examples, below, also demonstrate another beneficial feature of the present disclosure, i.e., that the disulfide crosslink cleavage achieved by the present compositions is reversible. That is, cleaved disulfide crosslinks within the treated polysulfide sealant are capable of reforming, thereby re-curing the treated polysulfide sealant. Re-curing may be accomplished by exposing the treated polysulfide sealant formed after applying the composition as described above, to an oxidizing atmosphere for an additional period of time. The oxidizing atmosphere may be air and the exposure may be carried out at room temperature. However, other oxidizing atmospheres and temperatures may be used. The additional period of time may be selected to achieve a desired degree, e.g., maximum, of re-curing. The additional period of time may be selected to increase the $T_g$ of the treated polysulfide sealant, or increase the Shore A hardness of the treated polysulfide sealant, or both. These increases are as compared to the polysulfide sealant prior to treatment with the composition (i.e., pre-treated polysulfide sealant/polysulfide sealant). These increases may be that which restore the respective values to those of the pre-treated polysulfide sealant, e.g., to a $T_g$ within ±2° C., to a Shore A hardness within ±2 units, or both, of the pre-treated polysulfide sealant. Although the additional period of time that achieves these results may depend upon the degree of uncuring in the treated polysulfide sealant, the selected composition, and the selected polysulfide sealant, in embodiments, the additional period of time is at least 2 hours, at least 4 hours, at least 6 hours, at least 12 hours, at least 16 hours, at least 18 hours, at least 20 hours, or in a range of from 2 hours to 24 hours, or from 4 hours to 24 hours. Prior to exposure to the oxidizing atmosphere, the treated polysulfide sealant may be isolated from the composition used for treatment.

The reversibility of the present compositions means that any uncuring in a treated polysulfide sealant, including due to an unintended application of the compositions may be remedied by re-curing the treated polysulfide sealant as described above. The reversibility also means that softening that accompanies uncuring may be leveraged to repair polysulfide sealants. By way of illustration, defects such as cuts, rips, divets, or tears, in a polysulfide sealant or a misplaced polysulfide sealant may be repaired by using the methods described above to form a treated polysulfide sealant and subsequently reshaping, repositioning, or otherwise manipulating the treated polysulfide sealant to repair the defect. Next, the treated polysulfide sealant may be exposed to an oxidizing atmosphere as described above for re-curing.

The present compositions may be provided together with a curable polysulfide composition as part of a polysulfide sealant system. Any of the curable polysulfide compositions described above or which are commercially available may be used. Any of the present compositions suitably configured for modifying a degree of cure in a polysulfide sealant formed from the selected curable polysulfide composition may be used. Also provided are methods of using such systems. Such methods comprising forming the polysulfide sealant from the curable polysulfide composition, e.g., according to manufacturer's instructions, and applying the present composition to a surface of the polysulfide sealant for a period of time. Removal of at least a portion of the treated polysulfide sealant, repair of a defect, re-curing, and combinations thereof may be further carried out as described above.

In embodiments, a method of using a polysulfide sealant system comprises forming a polysulfide sealant from a curable polysulfide composition; and applying a composition for modifying a degree of cure in the polysulfide sealant, the composition comprising a water-miscible organic solvent; water; and a dithiol composition, to a surface of the polysulfide sealant for a period of time, thereby forming a treated polysulfide sealant, wherein the application reduces a $T_g$ of the treated polysulfide sealant by at least 5° C. as compared to the polysulfide sealant, reduces a Shore A hardness of the treated polysulfide sealant by at least 5 units as compared to the polysulfide sealant, or both.

In embodiments, a method for modifying a degree of cure in a polysulfide sealant comprises applying a composition comprising a water-miscible organic solvent; water; and a dithiol to a surface of a polysulfide sealant comprising a defect for a period of time, thereby forming a treated polysulfide sealant; repairing the defect; and exposing the treated polysulfide sealant to an oxidizing atmosphere for an additional period of time.

The present compositions and related methods may be used with a variety of types of polysulfide sealants, including those used within the aerospace industry, the automobile industry, the submarine industry, etc.

EXAMPLES

Polysulfide sealant removal compositions were formed by mixing isopropanol and water in a 3:1 volume to volume ratio in a container, adding either DTE or DTT at 1 weight %, and mixing until the DTE/DTT dissolved. Into each container was placed a piece of polysulfide sealant (WS-8035 B-2 from Royal Adhesives and Sealants which use cured under standard temperature and humidity conditions). Each piece of polysulfide sealant had a length of about 1 inch, a width of about 1 inch, and a thickness of about 0.25 inches. Pieces were removed from their respective containers after specific time periods (see Tables 1 and 2). The surfaces of the exposed pieces were tacky and the color of the exposed pieces changed to light brown (from black). The removed pieces were tested for weight loss, Shore A hardness, and glass transition temperature ($T_g$).

For weight loss measurements, loose or tacky material was physically removed from exposed pieces by wiping prior to weighing. Weight loss was calculated as the difference between the original weight of the piece (prior to exposure to the polysulfide sealant removal composition) and the weight of the piece post-exposure and reported as a percentage of the original weight. For Shore A hardness and $T_g$ measurements, the exposed pieces were not wiped prior testing. Shore A hardness was measured on the exposed pieces by a Durometer of Type A used according to an ASTM standard D2240. $T_g$ measurements were made using a TA instruments DSC system. To obtain a sample for the $T_g$ measurements, a small piece of loose or tacky material was obtained from the exposed pieces. The results are shown in Tables 1 (DTE) and 2 (DTT), below. Control sample refers to a piece of polysulfide sealant not exposed to any of the polysulfide sealant removal compositions.

TABLE 1

Evaluation of polysulfide sealant removal composition based on DTE (neutral pH).

| Sample | Time (hours) | Weight loss (%) | Shore A hardness | $T_g$ (° C.) |
|---|---|---|---|---|
| Control | NA | 0 | 45 | −54.45 |
| DTE | 4 | 6 | 35.05 | −60.74 |
|  | 8 | 8 | 35.00 | −59.14 |
|  | 18 | 17 | 32.25 | −58.97 |
|  | 24 | 11 | 35.95 | −55.68 |

TABLE 2

Evaluation of polysulfide sealant removal composition based on DTT (neutral pH).

| Sample | Time (hours) | Weight loss (%) | Shore A hardness | $T_g$ (° C.) |
|---|---|---|---|---|
| Control | NA | 0 | 45 | −53.52 |
| DTT | 4 | 6 | 40.45 | −59.98 |
|  | 8 | 8 | 39.25 | −59.02 |

TABLE 2-continued

Evaluation of polysulfide sealant removal composition based on DTT (neutral pH).

| Sample | Time (hours) | Weight loss (%) | Shore A hardness | $T_g$ (° C.) |
|---|---|---|---|---|
| | 18 | 13 | 37.15 | −60.83 |
| | 24 | 11 | 42.55 | −56.80 |

The results show that exposure to DTE/DTT results in weight loss, reduction in Shore A hardness, and reduction in crosslinking. Notably, however, the hardness/$T_g$ results also show that after extended periods of time, e.g., beyond about 18 hours, crosslinking is restored (hardness increases/$T_g$ increases).

Additional experiments similar to those described above were performed, but hexamethylene ethylene diamine was added to the container to provide a pH of about 8. The results are shown in Table 3, below.

TABLE 3

Evaluation of polysulfide sealant removal composition based on DTE and DTT (pH ~8).

| Sample | Time (hours) | Weight loss (%) | Shore A hardness | $T_g$ (° C.) |
|---|---|---|---|---|
| Control | NA | 0 | 45 | −54.28 |
| DTE | 4 | 6 | 36.85 | −59.40 |
| | 8 | 10 | 36.00 | −61.47 |
| | 18 | 9 | 33.15 | — |
| | 24 | 19 | 32.40 | −58.64 |
| DTT | 4 | 5 | 36.75 | −60.47 |
| | 8 | 9 | 36.35 | −60.12 |
| | 18 | 30 | 29.60 | −61.29 |
| | 24 | 4 | 28.10 | −59.40 |

Finally, experiments similar to those described above were performed, but the amount of DTT/DTE was increased. For example, a polysulfide sealant removal composition containing DTT at 5 weight % and neutral pH achieved a weight loss at 18 hours of about 45%.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the invention to enable one skilled in the art to utilize the invention in various embodiments and with various modifications as suited to the particular use contemplated. It is intended that the scope of the disclosure be defined by the claims appended hereto and their equivalents.

What is claimed is:

1. A polysulfide sealant system comprising:
   a composition for modifying a degree of cure in a cured polysulfide sealant, the composition comprising a water-miscible organic solvent; water; and a dithiol; and
   a curable polysulfide composition for forming the cured polysulfide sealant, wherein the dithiol is a 1, 4 dithiol.

2. The polysulfide sealant system of claim 1, wherein the dithiol is dithiothreitol (DTT), dithioerythritol (DTE), or both DTT and DTE.

3. The polysulfide sealant system of claim 1, wherein the water-miscible organic solvent is a ketone, an aldehyde, an alcohol, or a combination thereof.

4. The polysulfide sealant system of claim 1, the composition for modifying the degree of cure in the cured polysulfide sealant comprising a greater amount of the organic solvent than the water.

5. The polysulfide sealant system of claim 1, wherein the dithiol is present in the composition for modifying the degree of cure in the cured polysulfide sealant at an amount in a range of from 0.1 weight % to 10 weight %.

6. The polysulfide sealant system of claim 1, the composition for modifying the degree of cure in the cured polysulfide sealant having a pH in a range of from 7 to 10.

7. The polysulfide sealant system of claim 6, wherein the pH is in a range of from 8 to 9.

8. The polysulfide sealant system of claim 1, the composition for modifying the degree of cure in the cured polysulfide sealant further comprising a gelling agent, a basic pH agent, or both.

9. The polysulfide sealant system of claim 1, the composition for modifying the degree of cure in the cured polysulfide sealant consisting of the water-miscible organic solvent; the water; and the dithiol.

10. The polysulfide sealant system of claim 1, wherein the cured polysulfide sealant has a glass transition temperature $T_g$ in a range of from −70° C. to −40° C.

11. A method comprising:
    forming a cured polysulfide sealant from a curable polysulfide composition; and
    applying a composition for modifying a degree of cure in the cured polysulfide sealant to a surface of the cured polysulfide sealant for a period of time, the composition comprising a water-miscible organic solvent; water; and a dithiol.

12. A method for modifying a degree of cure in a cured polysulfide sealant, the method comprising applying a composition comprising a water-miscible organic solvent; water; and a dithiol to a surface of a cured polysulfide sealant for a period of time, thereby forming a treated polysulfide sealant comprising at least partially uncured polysulfide sealant.

13. The method of claim 12, further comprising applying a force sufficient to remove at least a portion of the at least partially uncured polysulfide sealant from the treated polysulfide sealant.

14. The method of claim 12, wherein the cured polysulfide sealant is in contact with an aerospace structure.

15. The method of claim 12, wherein the applying reduces a glass transition temperature $T_g$ of the treated polysulfide sealant by at least 5° C. as compared to the cured polysulfide sealant, reduces a Shore A hardness of the treated polysulfide sealant by at least 5 units as compared to the cured polysulfide sealant, or both.

16. The method of claim 12, further comprising exposing the treated polysulfide sealant to an oxidizing atmosphere for an additional period of time.

17. The method of claim 16, wherein the exposure brings the treated polysulfide sealant's glass transition temperature $T_g$ to within ±2° C. of that of the cured polysulfide sealant, the treated polysulfide sealant's Shore A hardness to within ±2 units of that of the cured polysulfide sealant, or both.

18. The method of claim 16, wherein the cured polysulfide sealant comprises a defect and the method further comprises repairing the defect prior to exposing the treated polysulfide sealant to the oxidizing atmosphere for the additional period of time.

19. The polysulfide sealant system of claim 1, wherein the dithiol has a solubility in water at room temperature of at least 1 mg/mL.

20. The method of claim 11, wherein the dithiol has a solubility in water at room temperature of at least 1 mg/mL.

21. The method of claim 11, wherein the dithiol is a 1, 4 dithiol.

22. The method of claim 11, wherein the dithiol is dithiothreitol (DTT), dithioerythritol (DTE), or both DTT and DTE.

23. The method of claim 12, wherein the dithiol has a solubility in water at room temperature of at least 1 mg/mL.

24. The method of claim 12, wherein the dithiol is a 1, 4 dithiol.

25. The method of claim 12, wherein the dithiol is dithiothreitol (DTT), dithioerythritol (DTE), or both DTT and DTE.

26. The polysulfide sealant system of claim 1, the composition for modifying the degree of cure in the cured polysulfide sealant consisting of the water-miscible organic solvent;
the water; the dithiol; a gelling agent, and a basic pH agent.

* * * * *